(No Model.) 9 Sheets—Sheet 3.

T. L. WALLACE & J. A. REED.
SAW FILING MACHINE.

No. 561,147. Patented June 2, 1896.

Fig. 4.
Scale 1¼"=1'.

Fig. 5.
Scale 1¼"=1'.

WITNESSES:
F. W. Warner.
J. A. Walsh

INVENTORS
Thomas L. Wallace
AND James A. Reed,
BY Chester Bradford,
ATTORNEY.

(No Model.) 9 Sheets—Sheet 4.

T. L. WALLACE & J. A. REED.
SAW FILING MACHINE.

No. 561,147. Patented June 2, 1896.

WITNESSES:

INVENTORS
Thomas L. Wallace
and James A. Reed.
BY
Chester Bradford,
ATTORNEY.

(No Model.) 9 Sheets—Sheet 6.

T. L. WALLACE & J. A. REED.
SAW FILING MACHINE.

No. 561,147. Patented June 2, 1896.

WITNESSES:
F. W. Kramer
J. A. Walsh

INVENTORS
Thomas L. Wallace
James A. Reed,
BY Chester Bradford
ATTORNEY.

UNITED STATES PATENT OFFICE.

THOMAS L. WALLACE AND JAMES A. REED, OF INDIANAPOLIS, INDIANA, ASSIGNORS TO THE E. C. ATKINS & COMPANY, OF SAME PLACE.

SAW-FILING MACHINE.

SPECIFICATION forming part of Letters Patent No. 561,147, dated June 2, 1896.

Application filed March 12, 1894. Serial No. 503,346. (No model.)

*To all whom it may concern:*

Be it known that we, THOMAS L. WALLACE and JAMES A. REED, citizens of the United States, residing at Indianapolis, in the county of Marion and State of Indiana, have invented certain new and useful Improvements in Saw-Filing Machines, of which the following is a specification.

The object of our said invention is to produce a machine by which saws may be set and filed at a single operation and automatically fed through the machine as the setting and filing proceeds.

Said invention consists, generally speaking, in mechanism for effecting the setting, mechanism for effecting the filing, mechanism for effecting the feeding, and devices for adjusting and manipulating the several parts.

A machine embodying said invention will be first fully described, and the novel features thereof then pointed out in the claims.

Referring to the accompanying drawings, which are made a part hereof and on which similar letters of reference indicate similar parts, Figs. 6ª and 6ᵇ, detail views of fragments of the feeding devices where they engage; Fig. 8ª, a detail view showing the shifted position of the parts illustrated, being otherwise similar to a portion of Fig. 8.

In said drawings the portions marked A represent the table or framework of the machine; B, the driving-shaft; C, a jointed shaft driven from said main shaft; D and D', two other jointed shafts driven from the shaft C; E E', the pitmen driving the files; F F', guides for said pitmen; G G', rocking heads carrying the pitmen-guides; H H', standards carrying said rocking heads; I and I', the two jaws of the saw clamp or vise; J J', cross-bars carrying the saw-support; K, said saw-support; L, the lever carrying pawls whereby the saw is automatically fed through the machine; M, standards carrying the anvils and hammers; N, said hammers; O, the anvils; P P', levers by which the rocking heads G G' may be controlled sufficiently to cause the files to operate, or not, as may be desired; Q, a lever whereby the levers P P' are manipulated; R, file-carriages, in the form of cross-heads, carrying the files; S, said files, and T the saw placed in the machine and in process of being operated upon.

The table A rests upon legs A' or other suitable supports, and is of suitable size and shape to receive the various supports and bearings for the mechanism of the machine, which supports and bearings will be described, so far as is necessary, in connection with the parts which they carry. Some of these are adjustable in order to enable the mechanism to be moved in arranging for the various kinds of filing which may be done by means of this machine.

The main shaft B is mounted in bearings $b$ $b'$ in the table A, and is driven from any suitable source of power (not shown) by a belt B' and pulley $B^2$ or otherwise, and it has upon its rear end a miter-gear $B^3$ through which it drives the jointed shaft C. At points where it passes the saw vise or clamp and the hammer-supporting standards it is provided with other gears, cams, and wheels for operating parts of the mechanism, as will be described in connection therewith.

Figure 1:
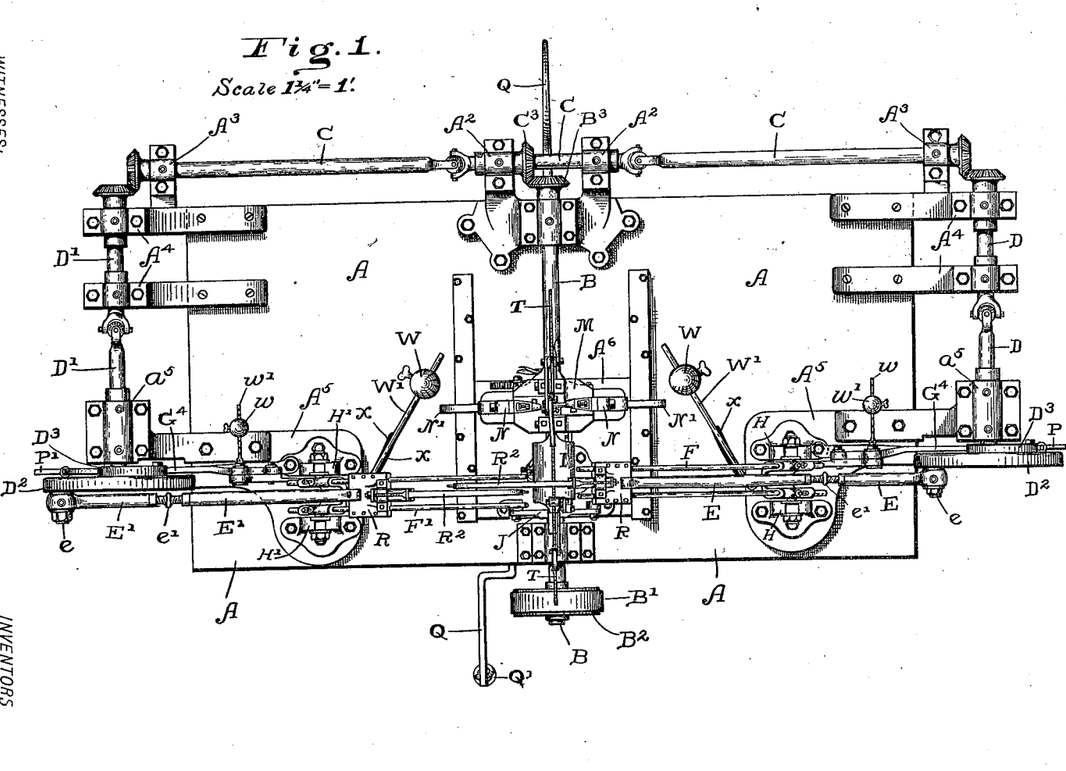
Figure 1 is a top or plan view embodying said invention.
Figure 3:
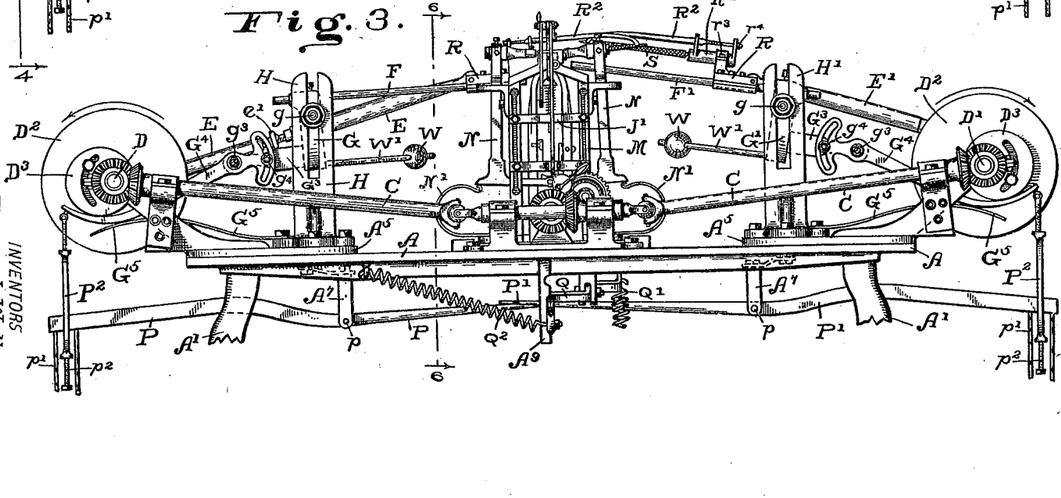
Fig. 3, a rear elevation.

The shaft C is formed in three parts, the middle or stationary part of which is mounted in bearings $A^2$ on the table A, and the outer or inclined parts of which are mounted in bearings $A^3$, and are connected to the middle or stationary part by universal joints, as shown most plainly in Figs. 1 and 3. It is driven from the shaft B through the miter-gears $B^3$ and $C^3$, and is best arranged at substantially right angles therewith.

Figure 25:
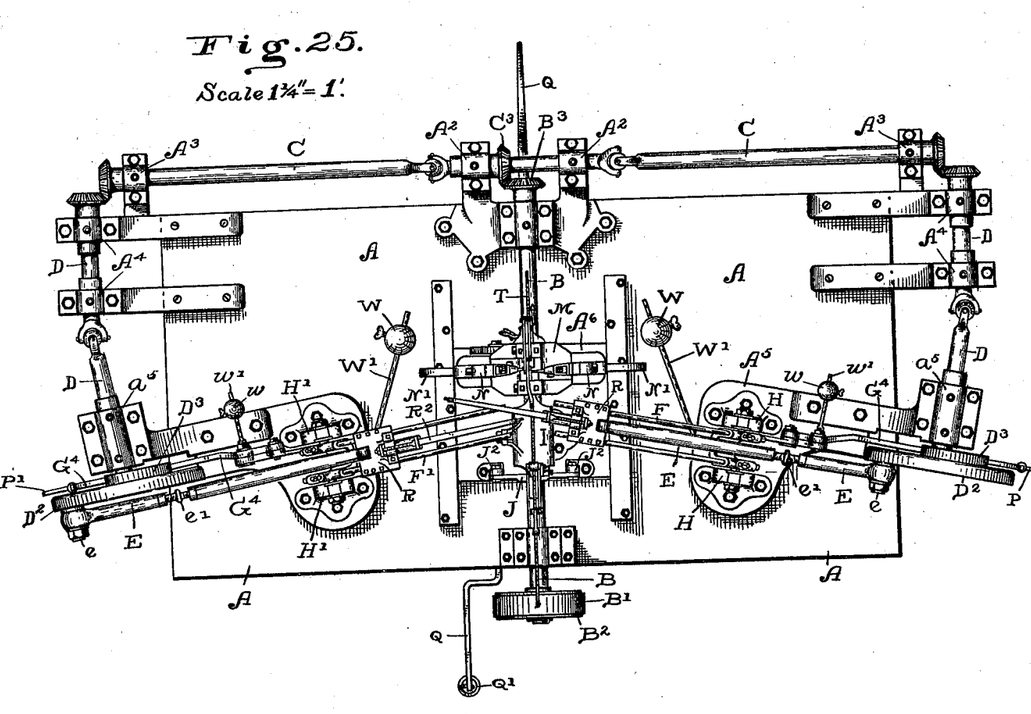
Fig. 25, a view similar to Fig. 1, except that the machine is shifted in position, showing the files arranged to operate at an angle, which, it may be said, is the most common arrangement of the machine. All the other views are shown with the machine arranged with the files at right angles with the saw, which is one position the machine may occupy in use and is the most convenient position to illustrate. It will be understood, however, that the machine is capable of being shifted to the position shown in Fig. 25 or to any other position within the range of its adjustment which may be desired. These drawings are made to a scale from a full-sized operative machine, and the scale is marked on each of the principal figures. The machine illustrated is a double machine, but obviously a single machine may be easily constructed embodying the same principles and within our invention.

The shafts D and D' are alike and are located at opposite ends of the machine, the stationary portion of said shafts being mounted in bearings $A^4$ on the table A, and the movable portion being mounted in bearings $a^5$ upon the large adjustable brackets $A^5$, which carry the pitmen mechanism. The parts of these shafts are connected by universal joints, as shown in several figures of the drawings, and thus permit the adjustment of the brackets $A^5$ from one point to another, as may be desired, two of the positions being shown by Figs. 1 and 25, respectively. Upon the ends of these shafts D and D' are the crank-wheels $D^2$ and the cams $D^3$. The service which these parts perform in the operation of the machine will be more fully described in connection with the parts which they operate. The means of adjustment for the brackets $A^5$ (shown in the drawings) are the curved slots $x$ in the face of the table A, into which the securing-bolts $y$ for said brackets enter and along which they obviously may be moved.

Figure 2:
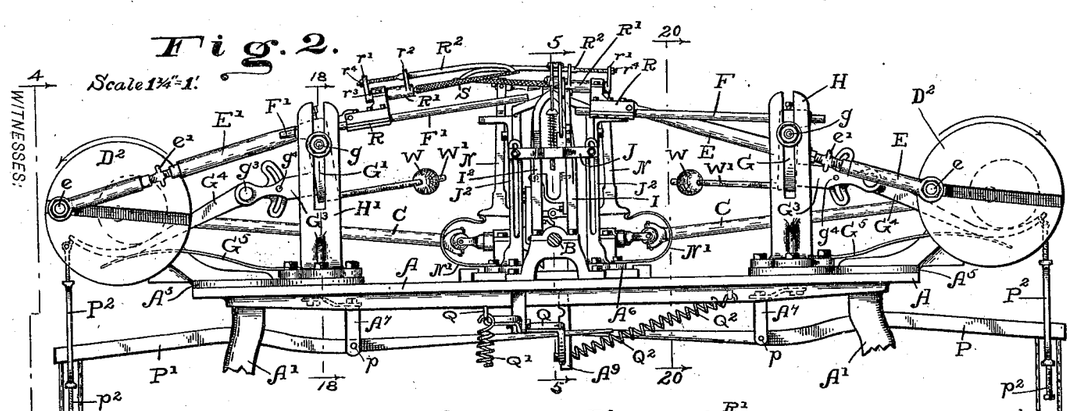
Fig. 2, a front elevation of the same, the driving-pulley being broken away.
Figures 19, 20, 21, 22:
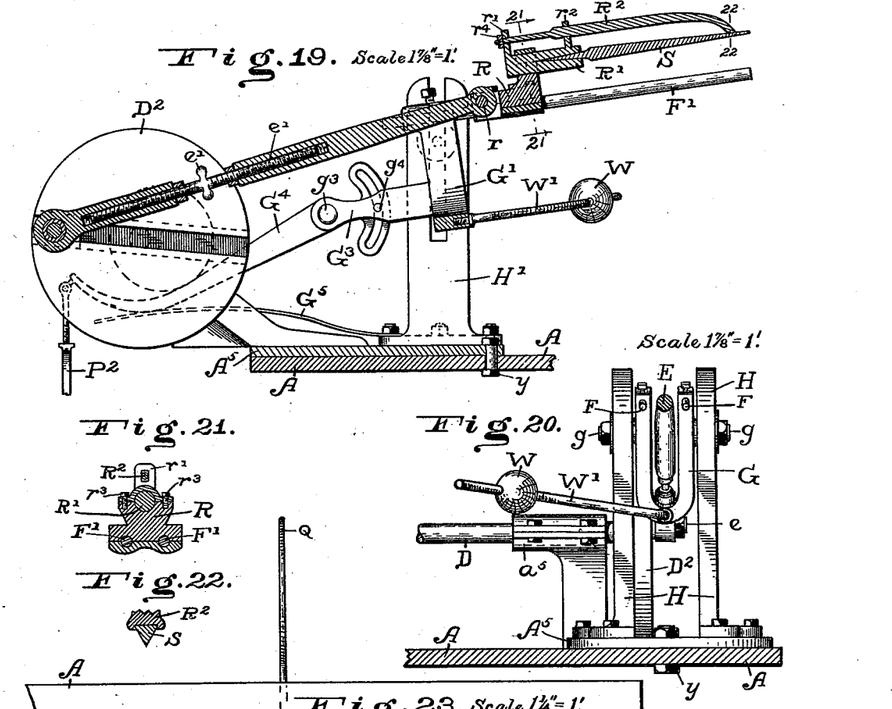
Fig. 19, a longitudinal vertical sectional view on the dotted line 19 19 in Figs. 2 and 18.
Fig. 20, a transverse sectional view on the dotted line 20 20 in Fig. 2.
Figs. 21 and 22, transverse sectional views on the dotted lines 21 21 and 22 22, respectively, in Fig. 19.
Figure 23:
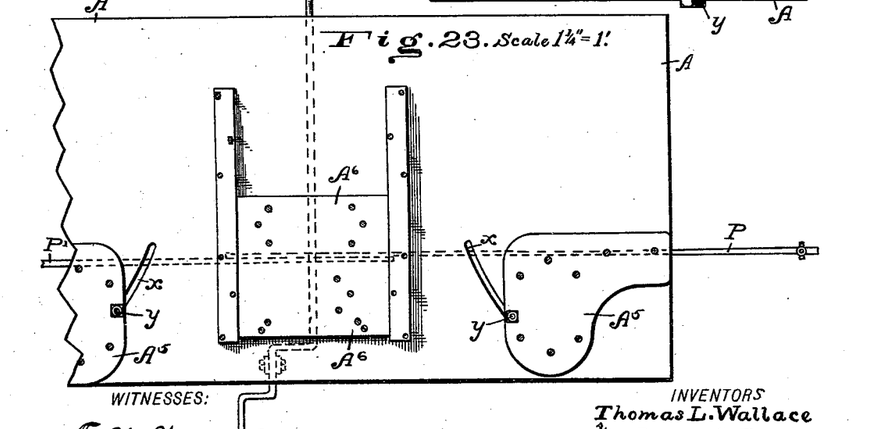
Fig. 23, a plan view of the bed-plate and the adjustable mechanism-carrying plates thereon, showing also the mechanism below the level of the table by means of dotted lines.

The pitmen E and E' are secured by suitable wrists $e$ to the crank-wheels $D^2$ at one end, and are driven thereby, and are attached to the cross-heads or file-carriages R at the other and operate said file-carriages. The wrists $e$ are adjustable in the slots in which they are secured, as will be readily seen by an examination of Fig. 2, and the pitmen themselves are adjustable in length, being provided with the screw-threaded extension-pieces $e'$, as most plainly shown in Fig. 19. The latter make the pitmen adjustable, so that the stroke will terminate at the same point of proximity to the saw being filed, notwithstanding the variations in the length of the stroke which may be caused by adjusting the position of the wrist $e$. This feature is most commonly of service in arranging for using files of different lengths. With longer files the wrists will be adjusted nearer the periphery of the crank-wheels, thus causing the pitmen to travel through a greater space, and the pitmen themselves must then be made correspondingly shorter, else the cross-heads or file-carriages would be driven too far; and with shorter files the wrists are adjusted toward the center of the crank-wheels and the pitmen lengthened, thus enabling the file-carriages to stop at the same point, as will be readily understood by an examination of the drawings.

The rods or slideways F and F' constitute the supports or guides for the cross-heads or file-carriages R. They are themselves supported by the rocking heads G and G', as will be presently described. In themselves they are simple slides for the cross-heads, supporting said cross-heads during their movements back and forth.

The rocking heads G and G' are mounted on trunnions $g$ in adjustable bearings $G^2$, which in turn are mounted in standards H and H'. The bearings $G^2$ are adapted to be secured at any height in said standards which may be desired, as will be readily understood upon an inspection of Fig. 18, being formed of a shouldered hollow bolt with a head, nut, and washer, the head engaging in grooves $h$ on the inside, and the nut and washer being upon the outside, where they can be readily tightened and loosened, while the longitudinal perforations serve as the bearings for the gudgeons $g$. Rigidly but adjustably secured to these rocking heads are arms composed of two parts $G^3$ and $G^4$, which extend out and come in contact with the cams $D^3$ upon the shafts D', and it is obvious that as the cams revolve the rocking heads will be rocked back and forth, and the angle of inclination of the slides F and F' thus varied. This is so that the file shall have the swinging motion which has heretofore only been secured by the natural movement of the arms of a filer in hand-filing, and which raises the file out of contact with its work as it reaches the end of the stroke, so that it shall return for a new stroke, free from the saw. The exact adjustment necessary in any particular case is secured by means of the pivot-bolt $g^3$ and the adjusting-bolt $g^4$, the former uniting the two parts $G^3$ and $G^4$, and the latter being secured to the part $G^3$ and entering the curved slot in the end of the part $G^4$, as will be readily seen upon an examination of Figs. 2, 3, and 19. Springs $G^5$ serve to keep the arms $G^4$ in close contact with the cams $D^3$ at all times, except when forcibly separated therefrom. These rocking heads are provided with weights W, mounted on arms W', extending out from said heads, which weights serve to hold the file down into contact with the saw-teeth with the desired force. As will be observed, said arms depart from the pivot-point of said rocking heads, as well as diverge therefrom, and so adjusting the weights along said arms will cause them to operate with more or less force upon the files, as will be readily understood. Upon the opposite side of the pivots or gudgeons upon which the rocking heads are mounted I prefer to extend out other small arms $w'$, upon which, upon occasion, small weights $w$ may be mounted. These are principally used when it is desired temporarily to partially counterbalance the weights W, as when a saw which is apparently somewhat softer than the general run is being filed. By means of these weights, also, we are enabled to vary the pressure to suit the condition of the file. When new files are placed in the machine, less pressure is required than after they become somewhat worn, to give them the proper cut, and we therefore shift the weights to produce greater pressure as the filing proceeds, until the file is entirely worn out, and a new one again inserted, when the weights are restored to the position where they exert a minimum of pressure, or removed altogether, as circumstances may require.

The standards H and H' are secured to the adjustable base-plates or brackets $A^5$ (which also carry the bearings for the shafts D and D') and support the rocking heads G and G' and their attachments. As shown most plainly in Figs. 1, 2, 3, 18, and 20, they are separated sufficiently to permit the rocking heads to be positioned between them, and they are slotted, as also shown in said figures, to receive the adjustable bearings carrying the gudgeons of said rocking heads.

Figures 12, 13, 14:
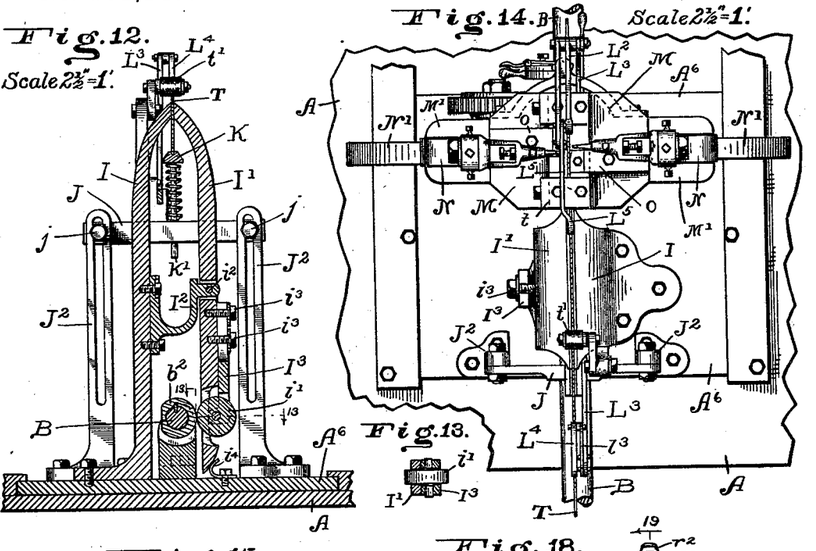
Fig. 12, a fragmentary longitudinal sectional view on the dotted line 12 12 in Fig. 4.
Fig. 13, a detail transverse vertical sectional view on the dotted line 13 13 in Fig. 12.
Fig. 14, a top or plan view of the central portion of the machine, similar to a portion of Fig. 1, on an enlarged scale.

The saw clamp or vise is composed of the two jaws I and I', the former of which extends down and is rigidly secured to the adjustable plate $A^6$ on the bed-plate A, while the other is pivoted upon an arm $I^2$, secured to the jaw I by means of a pivot $i^2$. The jaws of this device are adapted to clamp the saw firmly in position while being operated upon and to periodically release it, so that it may be fed forward. For the purpose of effecting the latter operation the jaw I' is provided near its lower end with a truck $i'$, and upon the shaft B is a corresponding truck $b^2$, one side of which is flattened, thus making it a cam. Obviously, when it is so revolved that the flattened side is next to the truck $i'$, the pressure on the jaws will be released, as will be readily seen by an examination particularly of Fig. 12. In order that the pressure may be regulated exactly as desired, the truck $i'$ is carried in an adjustable housing $I^3$, which is secured to the jaw I' by machine-screws $i^3$, extending through a slot in the housing, and said housing and its truck may therefore obviously be adjusted vertically, and the distance between the axes of the trucks $i'$ and $b^2$ thus varied, with a consequent variation in the pressure, as will be readily understood. The flattened side or cam-face of the truck $b^2$ is of course given the relative arrangement to the other parts of the mechanism which causes the pressure to be released just at the moment it is desired to feed the saw forward. A spring $i^4$, secured to the plate $A^6$ and bearing against the lower end of the jaw I', serves to promptly swing said jaw apart from the jaw I at the clamping end, and thus open the vise.

Figure 5:
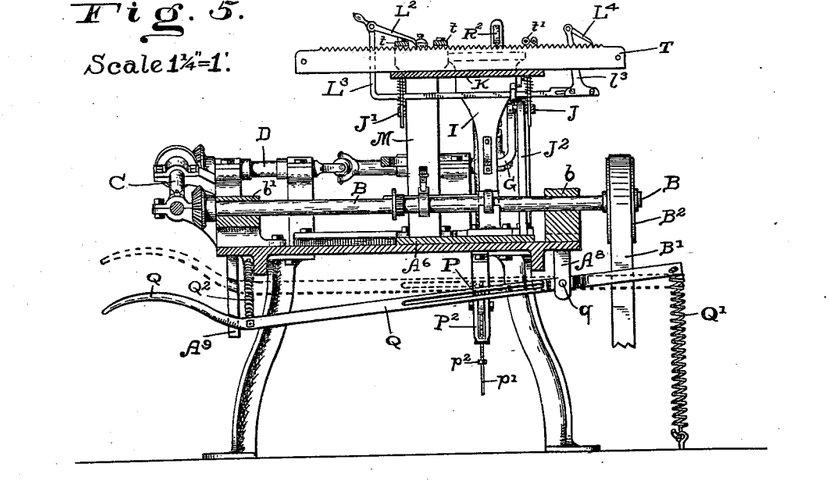
Fig. 5, a transverse central sectional view as seen from the dotted line 5 5 in Fig. 2.
Figure 6:
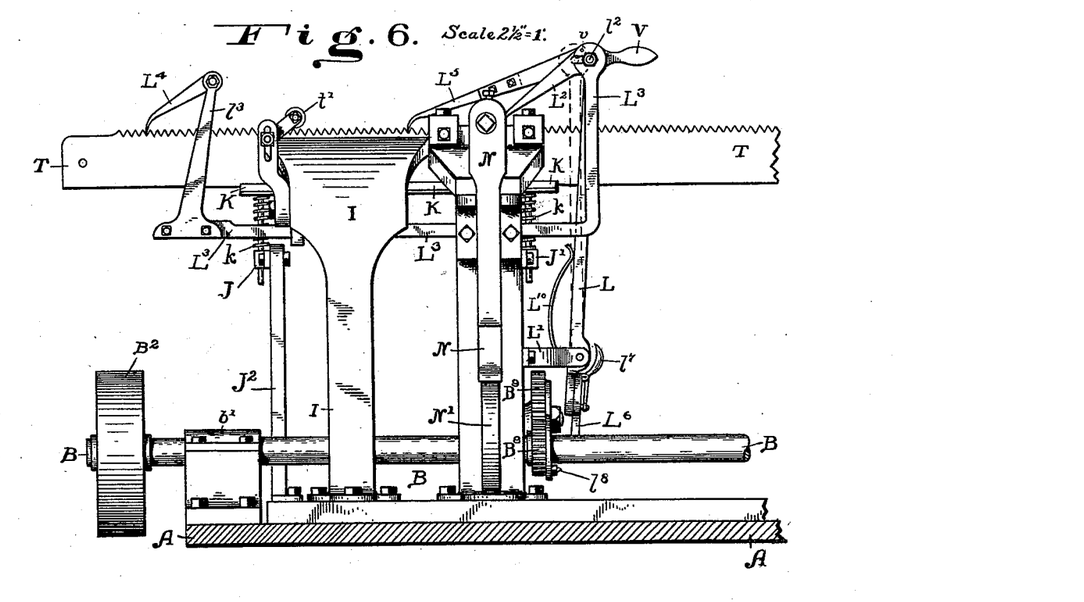
Fig. 6, a view as seen from the dotted line 6 6 in Fig. 3.
Figure 6A:
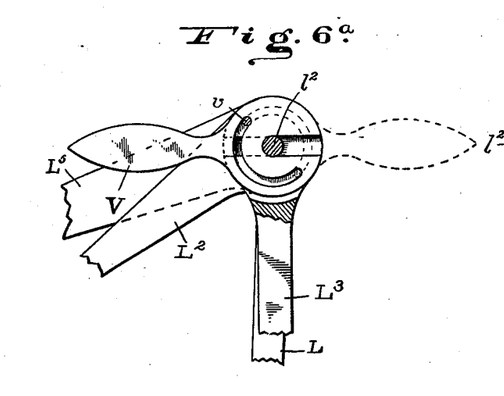
Figure 6B:
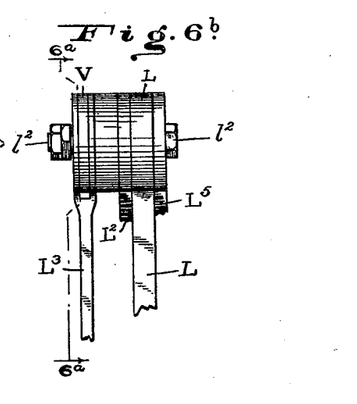
Figure 24:
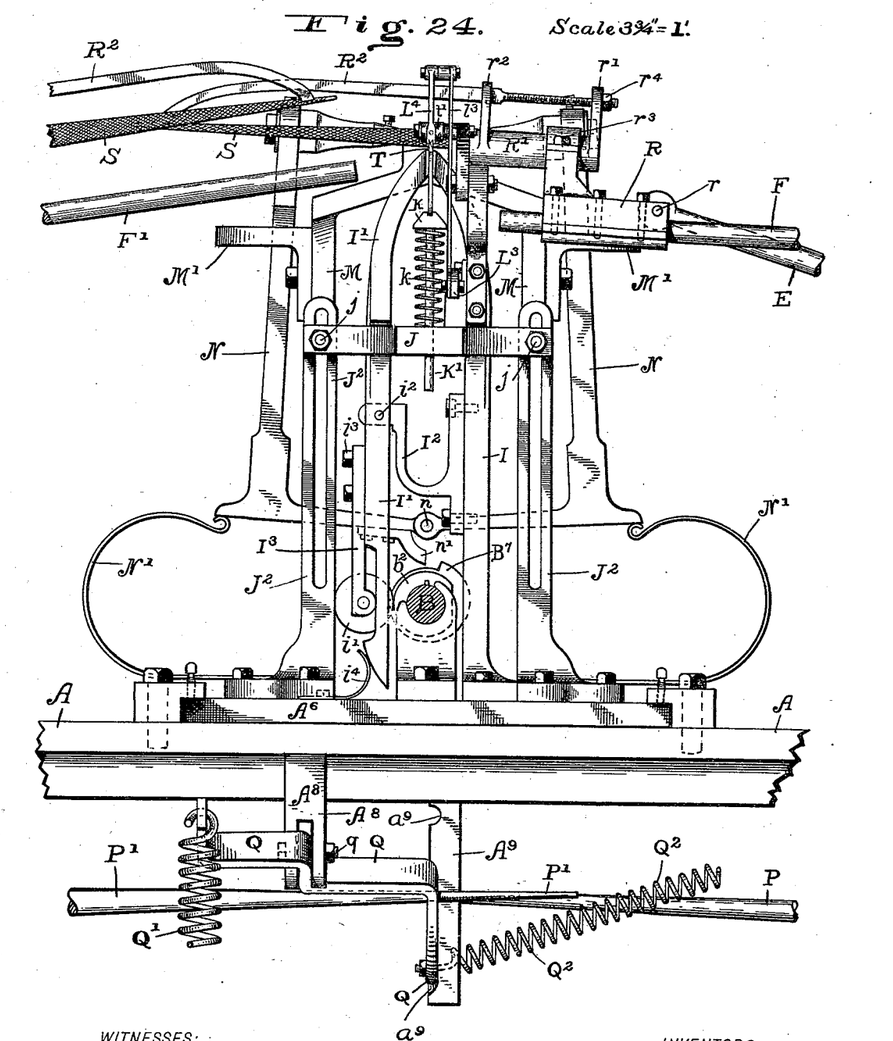
Fig. 24, a front elevation of the central mechanism of the machine, similar to a portion of Fig. 2, but on a much larger scale.

The cross-bars J and J' are for the purpose of carrying the saw-support. The bar J is adjustably secured to standards $J^2$, as plainly shown in Figs. 2, 12, and 24, said standards being slotted to receive the attaching-bolts $j$. The bar J' is secured in grooves in the standards M, as shown in Figs. 3, 5, and 6, and is rendered adjustable by means of the bolts $j'$. By moving these two bars J and J', as will be readily seen, the saw-support can be adjusted to any desired level and any width of saw within the capacity of the machine thus accommodated.

The saw-support K is preferably a bar having a groove in its upper edge in which the back of the saw (or the holder) rests, and is mounted on pins K', which extend down through holes in the bars J and J', and are held in place thereby. Surrounding said pins, and interposed between the bars J and J' and the under side of said holder K, are springs $k$, which directly support the saw-support K, together with the saw, holding said saw up against the gages $t$ $t'$, which limit its upward movement, and whereby the edge of the saw is always maintained at the same level in proper position for filing. The gage $t'$, it may be remarked, is of hard rubber, rawhide, hard wood, or some such material which will not dull the points of the teeth after they are filed, and is in the form of a roller, so that it will roll along over said points as the saw is fed forward. The gage $t$ being in contact with the dull part of the saw need not be of this description, although it may be, if desired. By a comparison of Figs. 5, 15, and 16 various constructions of the saw-support will be noted. In Fig. 5 is the simplest form, wherein the saw is a straight saw, both front and back.

Figures 15, 16, 17, 18:
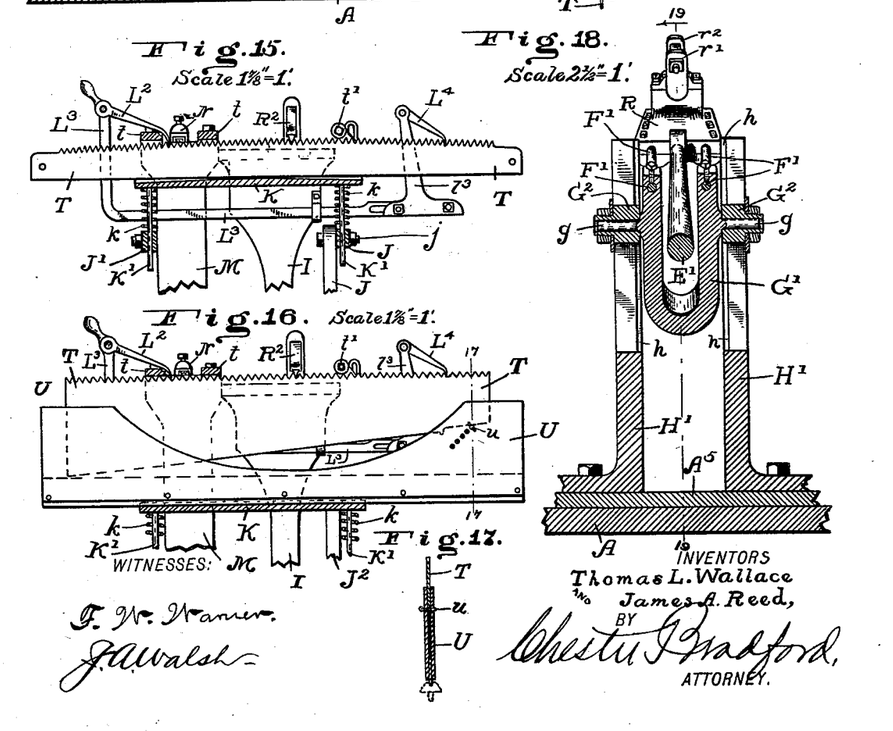
Fig. 15, a view similar to a portion of Fig. 5, on a somewhat enlarged scale, showing the construction for treating a saw with a curved cutting edge.
Fig. 16, a similar view showing the construction for treating a handsaw.
Fig. 17, a detail sectional view of the handsaw-holder, on the dotted line 17 17 in Fig. 16.
Fig. 18, a transverse sectional view through the rocking head and its standards, on the dotted line 18 18 in Fig. 2.

In this case the surface of the saw-support should likewise be straight. In Fig. 15 the breast or cutting edge of the saw is shown as curved or rounding, and in such a case we have found it necessary to make the saw-support also somewhat rounding, in order that the supporting force shall be applied at a single point between the two gages $t\ t'$, and thus hold the breast of the saw to exactly a uniform place, so that uniformity of setting may be secured. In Fig. 16 we have shown a device by which a tapered blade, like a handsaw-blade, can be secured in our machine. By an examination of this figure and of Fig. 17 the construction will be readily understood. A holder U, formed of three pieces of sheet metal and provided with an adjustable pin $u$, which can be positioned in accordance with the size and angle of the saw-blade, is provided, and thus the cutting edges of the saws can be brought in line, notwithstanding the taper on the back of such blade. It will be readily seen that by the adjustment of the bars J and J' any width of saw-blade may be provided for within the limit of the size of the vise, and said adjustment can be varied so that the saw-support K may be either close up to the upper ends of the jaws I and I' or lowered until it nearly rests upon the curved arm $I^2$.

Figure 4:
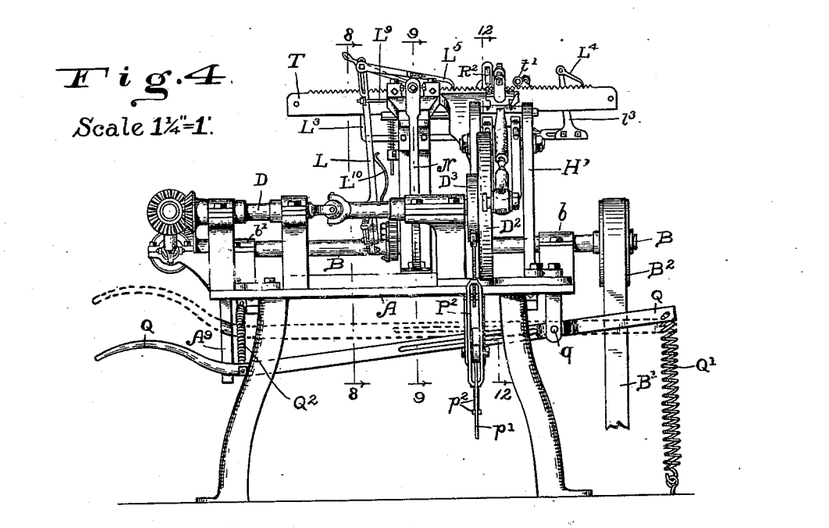
Fig. 4, an end elevation as seen from the dotted line 4 4 in Fig. 2.
Figures 7, 8, 8A:
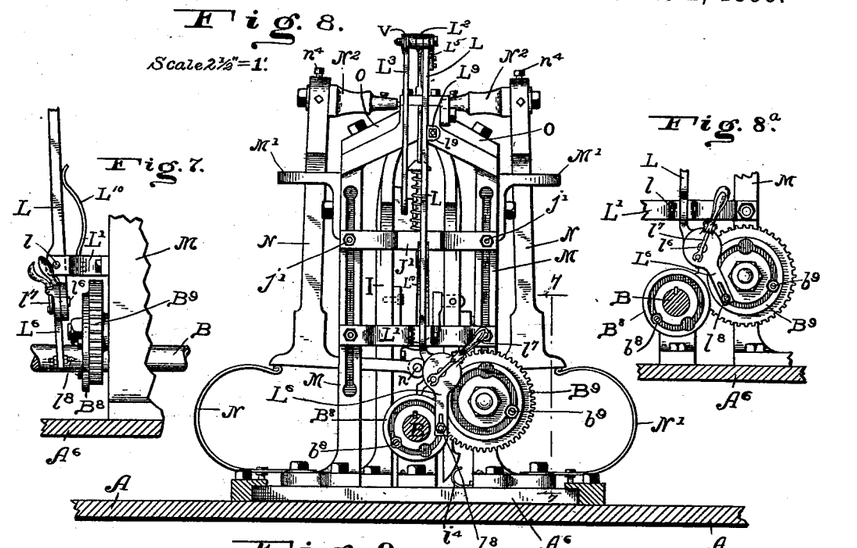
Fig. 7, a detail view as seen from the dotted line 7 7 in Fig. 8.
Fig. 8, a fragmentary longitudinal sectional view at the center of the machine, on the dotted line 8 8 in Fig. 4, on an enlarged scale.

The lever L is secured by a pivot $l$ to a cross-bar L', which latter is secured to the standards M, and said lever extends up to above the saw being at the time operated upon and carries upon its upper end the two pawls $L^2$ and $L^5$, which engage with the teeth of the saw and feed it forward during the greater part of the operation of filing. The pawl $L^5$ is divided and adjustable, so that both pawls may engage evenly with the teeth. The frame $L^3$ is supported appropriately upon the vise part I and extends forward to beyond where the files operate upon the saw in filing, and is there provided with a pawl $L^4$. This frame $L^3$ is adapted to be connected to the lever L or not, and thus be moved by said lever or not, as may be desired. The means of attachment is a pivoted and slotted handle V, secured in a slot in the frame $L^3$ by a pivot $v$, and adapted, when turned in one direction, to pass freely off and on the pivot-bolt $l^2$ (which also connects the pawls $L^2$ and $L^5$ to the lever L) and, when turned in the other direction, to engage with said pivot-bolt $l^2$. By this means the lever L may drive this frame $L^3$ and the pawl carried thereby back and forth, the same as it drives the pawls $L^2$ and $L^5$. In operation when the saw is first inserted in the machine the pawls $L^2$ and $L^5$ first operate to feed it forward until it is nearly filed, the frame $L^3$ and its pawl meantime remaining idle. When the saw has been filed so far as to escape from the pawl $L^2$, the handle V is thrown over, (see Fig. 6$^a$,) engaging with the pivot-bolt $l^2$ and setting the frame $L^3$ and its pawl in operation, which feeds the saw on out of the machine. Except that the teeth of a saw are apt to be slightly irregular, all the pawls might be in engagement during the entire operation of filing; but where there are such irregularities (which are very common in saws) it is better to have the pawls engaging at one end only. As will be readily understood, great accuracy of feeding is required, particularly in order that the setting-hammers may strike the teeth fairly and centrally. The arm $l^3$ on the frame $L^3$ is adjustable, as shown, in order that the pawl $L^4$ may be adjusted as required. As shown in Fig. 6, the movement of the upper end of the lever L and the connected parts is slight, and the pivot-bolt in operation does not escape from the slot in the upper end of the frame $L^3$ at all during such movement, the extreme position being indicated by dotted lines. The lever L is operated at the bottom by a cam either upon a wheel upon the shaft B or on a wheel driven therefrom. In some cases it is desirable that the file shall make two strokes before the saw is fed forward, and in other cases only one stroke is necessary. One cam, therefore, is arranged to come into engagement twice as often as the other, and the bottom of the lever, which is provided with the cam point or face to engage with said cams, is arranged to be shifted to come into contact with either of them. Upon the lower end of the lever, therefore, we place an extension $L^6$, which is secured thereto by a pivot $l^6$, and is provided with a clutch $l^7$. By means of said clutch this extension can be secured in either the position shown in Fig. 8 or that shown in Fig. 8$^a$. In the extreme lower end of this extension we place a cam-point $l^8$, which is adapted to extend into the path of a corresponding cam-point $b^8$ on the wheel $B^8$ on the shaft B when it is desired that the feeding operation shall take place between every stroke of the file, and be shifted into the path of the cam-point $b^9$ on the wheel $B^9$ when it is desired that the feeding operation shall take place at every two strokes of the file. The wheels $B^8$ and $B^9$ are geared together, and the gear attached to the wheel $B^8$ is just half the size of that attached to the wheel $B^9$, so that there are two revolutions of the former to one of the latter. These devices are best illustrated in Figs. 8, 7, and 8$^a$. The lever L is limited in its backward movement by a bolt or rod $L^9$, extending out from one of the standards M, and passing through a perforation in the ear $l^9$ on said lever. The movement may be adjusted by means of the nut on said rod, as will be readily understood. Said lever is thrown back to its rearmost position by a spring $L^{10}$, secured to the cross-bar L' and bearing against the inner side of said lever, as shown in Figs. 4 and 7.

Figures 9, 10, 11:
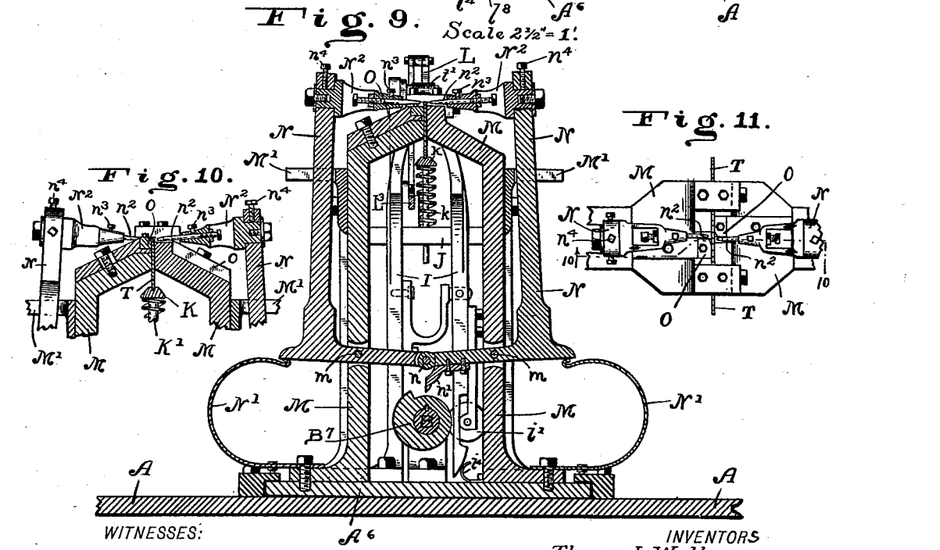
Fig. 9, a fragmentary longitudinal sectional view on the dotted line 9 9 in Fig. 4.
Fig. 10, a view somewhat similar to a portion of Fig. 9, on the dotted line 10 10 in Fig. 11.
Fig. 11, a fragmentary top or plan view of the parts shown in Fig. 10.

The standards M are rigidly secured to the base-plate $A^6$ and carry the hammers N and anvils O and other parts, as elsewhere described. In themselves these standards have no especial operation, but are supports and guides merely. The form of these standards is best shown in Fig. 9.

The hammers consist of swinging arms N, formed, preferably, with one part substantially at right angles with the other and mounted on pivots $m$ in the standards M. These arms are guided in their movements by forked brackets M', also on the standards M. The lower ends of these arms approach each other and are secured together by a pivot $n$, and secured to one of them, near said pivot, is a projection $n'$, with which a cam $B^7$ on the shaft B will come in contact as said shaft revolves, the effect, as will be obvious upon an inspection of Fig. 9, being to raise said projection and the arms at the points where they come together and swing the upper ends of said arms N, carrying the hammer-points, outwardly apart from each other. As the higher part of the cam $B^7$ escapes from the projection $n'$ the arms are free to be thrown inwardly toward each other, which is done by the springs N'. Each time the shaft B revolves, therefore, the upper ends of these arms are thrown outwardly by the cam and inwardly by the springs. Secured to the upper ends of the arms N are the hammers proper, $N^2$, which are provided with the adjustable hammer-points $n^2$, and these points are adjusted to strike the teeth of the saw and thus set them, said points, as shown in Fig. 11, being arranged to strike adjacent teeth, as well as from opposite sides, the result being that each second tooth is set by one hammer, while the alternate teeth are set by the other hammer. These hammer-points $n^2$ being at their rear ends in the form of threaded bolts, they can obviously be adjusted very finely, so that exactly the kind of set desired may be secured by their use. In order that they shall be held very rigidly and firmly in place, small set-screws $n^3$ are used, and similar set-screws $n^4$ are used to bind the hammers proper in the upper ends of the arms N.

The anvils O are secured firmly upon the upper sides of the standards M and are arranged to come directly in front of the hammer-points $n^2$. This is best illustrated in Figs. 10 and 11. As shown in Fig. 10, these anvils are also adjustable, being secured by means of slots and machine-screws. As will be readily understood, the setting of the teeth is effected by means of the hammer-points in connection with these anvils, said teeth being driven against the faces of said anvils by said hammer-points.

The levers P P' and Q are for the purpose of throwing the machine into and out of operation without stopping its motion. The levers P and P' are mounted on hangers $A^7$ by means of pivots $p$, and their outer ends engage with links $P^2$, which depend from the arms $G^4$. The inner ends of said levers enter a slot in the lever Q, and by means of said lever Q the levers P and P' can be simultaneously operated. The operation is, when the outer ends of the levers P and P' are thrown down they pull upon the arms $G^4$ through the links $P^2$, and thus rock the rocking heads G and G' inwardly, throwing the slide-rods or guides F and F' into a more sharply-inclined position, so that the files will be carried above and free from the saw throughout their entire movement instead of on the return movement only, as in the ordinary operation. In other words, by this means these parts are held into about the same position continuously that they are held intermittingly by the cams $D^3$ during the ordinary operation of the machine. The lever Q is mounted upon a pivot $q$ in a hanger $A^8$, and has a slot which receives the ends of the levers P and P', as shown in Figs. 2, 3, 4, and 5. This lever is counterbalanced by a spring Q', attached to its free end, and a downwardly-projecting arm $A^9$, having notches $a^9$, (see Fig. 24,) is provided to control its handle end. A spring $Q^2$ is provided to hold the handle end into contact with the arm $A^9$ and into the notches therein, as shown most plainly in Figs. 2, 3, and 24. The operator stands at the handle end of this lever, and, when it is desired to set the files to operating upon a saw, throws it down into the position shown in the drawings, said lever being held in this position by the arm $A^9$ and spring $Q^2$. When a saw is finished or when for any reason it is desired that the files shall be thrown out of operative position, he raises the lever-handle Q to the position shown in dotted lines, where it is held by the tension of the spring $Q^2$, assisted by the spring Q'. (See Figs. 4 and 5.)

The cross-heads or file-carriages R are mounted upon the guides or slideways F and F', and are driven by the pitmen E E', to which they are connected by pivots or gudgeons $r$. The files are seated in sockets R' on these carriages, provided for the purpose, and the socket structures have upwardly-projecting arms $r'$ $r^2$, in which is mounted a steady-arm $R^2$, which extends forward and rests upon the points of the files, as shown best in Figs. 2, 19, and 24. The sockets R' are round in cross-section (see Fig. 21) and are secured in their bearings by screws or bolts $r^3$, which, upon being loosened, permit said sockets, carrying the files and steady-arms, to be rocked and the corners of the files thus presented at differing angles, thus enabling the machine to file saws with either regular crosscut-saw teeth or rip-saw teeth or at such other angle as may be desired. The steady-arms $R^2$ are threaded upon the rear ends and carry nuts $r^4$, while the forward ends, which rest upon the points of the files, are provided with grooves having overhanging edges which extend down and grasp the sides of the file, as shown most plainly in Fig. 22. By first slipping these grooves over the files near their points, as shown, (see also Fig. 24,) and then turning up the nuts tightly the files are drawn back firmly into their sockets, where they are held firmly, and said files are easily removed by loosening the nuts and slipping the steady-arms forward, as will be readily understood.

The files S and the saw T are in themselves ordinary devices of the character, and are shown simply to illustrate how the former is secured in and operated by the machine and how the latter is secured in said machine and operated upon by the former by means of the machine.

It will be observed that this machine automatically sets and files the saw and feeds it along from tooth to tooth as the filing and setting operation proceeds, and also automatically clamps and unclamps the saw-plate at the proper time for the various operations, requiring no labor on the part of the operator except to place the saw in the proper position and to see that the machine is kept in order. By keeping one saw directly following another there will generally need to be no further attention paid to the machine until the corner of the file which is in use is worn out. By means of the lever Q and its attachments, however, the file may be thrown out of operation instantly when desired. By means of the adjustments of the weights and springs attached to the rocking head the force with which the file is brought against the saw may be accurately and delicately adjusted, so as to secure the greatest amount of service from each file. By shifting the plates $A^5$ and $A^6$ upon the bed-plate A any of the various positions desired may be secured and saws filed at any desired angle. By shifting the pitmen on the crank-wheels and adjusting their lengths longer or shorter files may be used. By adjusting the arms $G^3$ and $G^4$ a different sweep to the files may be provided for, and, generally speaking, as will be understood from the foregoing description, we have secured a machine which performs the operation of setting and filing saws in a manner closely approximating the corresponding operations when performed by hand, and at the same time have secured that greater certainty of uniformity and rapidity of execution which results from the employment of mechanical means. A single operator can manage two or more of these machines by properly timing the insertion of the saw-blades, and thus one operator and the required number of these machines is able to take the place of a much larger number of operators working by hand in the practical fitting up of saws. The work is not only done in a superior manner, but at a very greatly descreased expense.

Having thus fully described our said invention, what we claim as new, and desire to secure by Letters Patent, is—

1. The combination, in a filing-machine, of the table A thereto supporting the mechanism of the machine, the various bearings secured to said table, driving-shafts mounted in said bearings, the two plates or brackets $A^5$ adjustably mounted on said table, an independent group of filing-machine mechanism mounted on each of said plates with files secured to and driven by said mechanism, a plate $A^6$ adjustably mounted on said table between said plates or brackets $A^5$, and saw-carrying devices on said plate $A^6$, the whole being arranged and operating substantially as set forth.

2. The combination, in a filing-machine, of the main shaft, a shaft running transversely to the main shaft and geared thereto, and other shafts running at an angle from said transverse shaft and driven therefrom, said last-named shafts being formed in parts and said parts united by universal joints, whereby they are rendered adjustable, and groups of independently-adjustable filing-machine mechanism connected to said last-named shafts.

3. The combination, in a filing-machine, with groups of independently-adjustable mechanism, of the main shaft, a shaft formed in sections and arranged transversely thereof and driven therefrom, the several sections being united by universal joints, and other shafts running to various parts of the filing-machine mechanism and driven by said transverse shafts and also provided with universal joints.

4. The combination, in a filing-machine, with the file, of a file-carriage or cross-head carrying the same, guides or ways supporting said cross-head, a pitman for driving said cross-head, a swinging yoke carrying the guides or ways, an arm extending out from said swinging yoke, and a cam for operating said arm and thus moving said rocking head, whereby the file is driven forward at the proper level to come in contact with the saw and returned at a higher level.

5. The combination, in a filing-machine, of the rocking head carrying the cross-head or file-carriage ways, a cam, and an arm extending from said rocking head back to alongside said cam, said arm being divided and adjustable, whereby the motion of said rocking head may be adjusted as desired.

6. The combination, in a filing-machine, of the rocking head carrying the file-carriage ways, an arm extending out from said rocking head, a cam for operating said rocking head through said arm in one direction, and a spring whereby said arm is held in contact with said cam.

7. The combination, in a filing-machine, of a rocking head, slides or ways extending out from said rocking head, a file-carriage or cross-head mounted on said slides, a standard carrying said rocking head, and bearings adjustably secured to said standard in which said rocking head is immediately mounted, whereby it may be adjusted to a higher or lower level, substantially as set forth.

8. The combination, in a filing-machine, of a rocking head carrying the file-carriage or cross-head, means for operating the same, and a rigid arm extending out from said rocking head and carrying an adjustable weight, whereby greater or smaller pressure may be exerted upon the file in operation.

9. The combination, in a filing-machine, of a rocking head, mechanism for operating the same, an arm extending out therefrom, an adjustable weight upon said arm, and an arm or rod secured to the rocking-head structure upon the opposite side, and a weight adapted to be placed thereon whereby the first weight may be to some extent counterbalanced, substantially as set forth.

10. The combination, in a filing-machine, of a rocking head carrying the guides or ways for the file-carriage, a cam, a rigid arm extending out from said rocking head to alongside said cam by which it is thus ordinarily operated, a lever, and a connection from said lever to said arm, whereby it may, upon occasion, be thrown out of contact with said cam, and the file thus held continuously out of engagement with the saw.

11. The combination, in a filing-machine, with the arms of the two rocking heads, of the levers P P' and Q connected to said arms, whereby they may be simultaneously operated.

12. The combination, in a filing-machine, with the rocking-head arms, of the levers P P' and Q, and the spring $Q^2$.

13. The combination, in a filing-machine, of the saw-vise jaws, one of which is pivoted to the other, a cam for operating the pivoted jaw, and an adjustable housing, carrying a truck with which the cam will come in contact, mounted on said pivoted jaw, whereby the clamping can be controlled in accordance with the thickness of the saws, or otherwise, as may be desired.

14. The combination, in a filing-machine, of the spring-mounted saw-support K grooved to receive the back of the saw, and the saw-guides $t$ and $t'$ running over the breast or cutting edge of the saw, the latter being in the form of a roller and of a material not calculated to dull the saw-teeth, substantially as set forth.

15. The combination, in a filing-machine, of the vertically-adjustable bars J and J' mounted on suitable supports, the spring-mounted saw-support K mounted on said adjustable bars, the saw-vise, and the saw-guides.

16. The combination, in a filing-machine, of the saw-feeding lever L pivoted at $l$ to the saw-clamp structure, pawls on the upper ends of said lever for engaging with the saw and feeding the same forward, an extension on the lower end of said lever, a shaft arranged parallel with the saw being operated upon, a wheel secured to said shaft, and a cam-point adjustably secured to said wheel adapted to come in contact with the corresponding cam-point on the extension of the lever L, whereby, by adjusting said cam-point, the time of operation of said lever may be determined, substantially as set forth.

17. The combination, in a filing-machine, with the saw-feeding mechanism, of two cam devices for operating said mechanism, one revolving at double the speed of the other, and a shifting extension attached to said feeding mechanism adapted to be thrown into the path of either of said cam devices, whereby said feeding mechanism is caused to operate either at every motion of the machine, or at every other motion, as may be desired.

18. The combination, in a filing or setting machine, of the operating mechanism, and a feeding mechanism consisting of a lever with pawls on the upper end, a frame extending to the other end of the saw carrying another pawl, and devices whereby said frame may be attached to or detached from said lever at will and thus the distant pawl operated or not as may be desired.

19. The combination, in a saw filing and setting machine, of standards, hammers pivoted to said standards and united together at the extreme ends, a projection attached thereto and extending into the path of the cam, and a shaft carrying a cam for operating said hammers through said projection in one direction, and springs for operating said hammers in the other direction.

20. The combination, in a saw filing and setting machine, of hammers pivoted to the framework and to each other and adapted to be operated in one direction by mechanism, and springs adapted to operate said hammers in the other direction, substantially as set forth.

In witness whereof we have hereunto set our hands and seals, at Indianapolis, Indiana, this 8th day of March, A. D. 1894.

THOS. L. WALLACE. [L. S.]
JAMES A. REED. [L. S.]

Witnesses:
CHESTER BRADFORD,
JAMES A. WALSH.